United States Patent [19]
Morris et al.

[11] 3,799,471
[45] Mar. 26, 1974

[54] FISHING LINE TRANSFER DEVICE

[76] Inventors: Terence Roy Morris, 32 Cromwell Rd.; Francis Rodd, 34 Cromwell Rd., both of Ware, Hertfordshire, England

[22] Filed: Aug. 31, 1971

[21] Appl. No.: 176,489

[30] Foreign Application Priority Data
Sept. 3, 1970  Great Britain................... 42191/70

[52] U.S. Cl......... 242/84.1 R, 242/106, 242/129.51
[51] Int. Cl............................................... A01k 89/00
[58] Field of Search.......... 242/84.1 L, 84.1 R, 104, 242/106, 55.2, 85, 85.1, 129.51, 129.53, 136

[56] References Cited
UNITED STATES PATENTS
2,993,661   7/1961   D'Arrigo................... 242/84.1 L X
2,879,012   3/1959   Sarro................................ 242/55.2
1,960,273   5/1934   May................................ 242/129.53
3,088,686   5/1963   Curry................................ 242/55.2

*Primary Examiner*—Billy S. Taylor
*Attorney, Agent, or Firm*—William R. Liberman

[57] ABSTRACT

A device is provided for enabling a fishing line to be unwound from a storage spool on to a reel of a fishing rod. The device is in the form of a storage spool-holder and includes a base or web portion and a pair of resilient arms extending from the base or web portion. Each of the arms has an element, preferably hemispherical in shape, adapted to engage the storage spool to permit rotation thereof. The base or web portion is provided with means for attaching it to a fishing rod, preferably in the form of a frusto-conical rod-attachment member.

3 Claims, 3 Drawing Figures

FISHING LINE TRANSFER DEVICE

FIELD OF THE INVENTION

The present invention relates to a device for enabling a fishing line to be unwound from a storage spool on to the reel of a fishing rod and, in one embodiment of the invention, for enabling the reverse process to be carried out also.

SUMMARY OF THE INVENTION

According to the present invention there is provided a storage spool-holder comprising a base or web portion, a pair of resilient arms extending from the base portion and having elements adapted to engage a storage spool to permit rotation thereof, and means on the base or web portion for attaching the storage spool-holder to a fishing rod.

DESCRIPTION OF ILLUSTRATED EMBODIMENT

Figure 1:
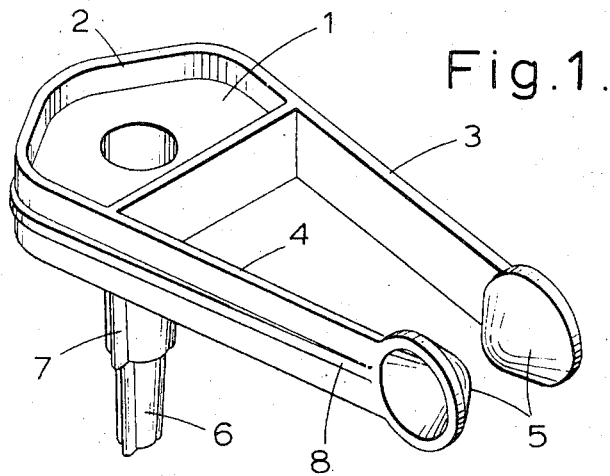
FIG. 1 is a perspective view of an embodiment of the invention.
Figure 2:
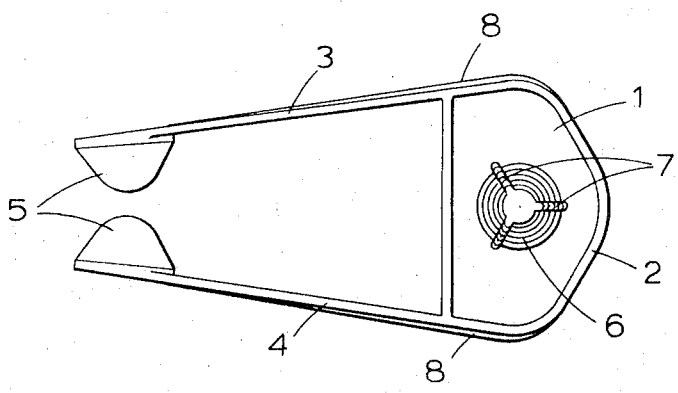
FIG. 2 is an underplan view of the embodiment of FIG. 1.
Figure 3:
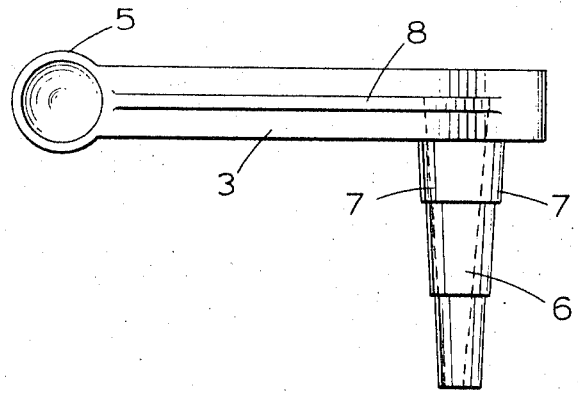
FIG. 3 is a side elevational view of the embodiment of FIGS. 1 and 2.

The illustrated embodiment is generally U-shaped as seen in FIG. 2 has a base or web portion 1 lying in a plane. The base or web portion has a surrounding wall 2 integral therewith. Extending from the wall 2 and integral therewith are a pair of arms 3 and 4 which converge towards one another in a direction towards the extremities of the arms remote from the base portion 1. The center lines of the arms lying in the same plane as the web, and are of a resilient material so that they are normally biassed towards the position illustrated. The extremity of each arm further from the base portion is provided with an approximately hemispherical head element 5 whose rounded surfaces face towards one another.

The base plate or web is also provided at its center, spaced from the marginal edges of the web with a generally frusto-conical rod-attachment member 6 formed of a resilient material and extending perpendicularly therefrom. The member 6 has its larger cross-section end nearer but spaced from the flange. The rod-attachment member 6 has longitudinally extending ridges 7 on its exterior to enable it to obtain a better grip on the rod.

So that the device can be used conveniently with different sizes of rods the member 6 has a discontinuous slope and comprises a number of sections (the illustrated embodiment has three). The member 6 is hollow, the interior thereof defining an aperture which extends the entire length thereof, and unlike the exterior has a smooth continuous slope.

To increase the stiffness of the arms 3 and 4, ribs 8 are moulded thereon.

In use, a rod on to which it is desired to wind a length of line is broken at one of its joints. The storage spool-holder is then attached to the end of the length of rod carrying the reel by inserting the rod-attachment member into the end of that length of rod. A storage spool containing the line to be wound on is mounted between the hemispherical heads of the storage spool-holder and the line can then be wound on to the reel rapidly and easily. The friction to which the storage spool is subjected by the heads maintains a tension in the line which promotes easy winding.

A further development of the invention enables a reel to be wound on to a storage spool, the storage spool being rotated manually, for example by a handle, or more conveniently, by an electric motor. Such a motor can be battery driven. In this case it is necessary for the spool to be positively held on a spindle and not just frictionally retained as in the embodiment illustrated.

The device is preferably made of an integrally moulded plastics material, polyethylene for example.

When it is desired to use the illustrated device with a rod which is not hollow the end of the length of rod carrying the spool may be inserted into the hollow interior of the rod-attachment member 6 instead of inserting the rod-attachment member into the rod.

We claim:

1. A generally U-shaped device for enabling a fishing line to be unwound from a storage spool, comprising a flat web in the bight of the U, a pair of integral, laterally spaced, resilient arms extending along the sides of the web and beyond, the arms having center lines in a plane and the web lying in said plane, the free ends of the arms having spool engaging portions adapted to engage a spool to permit rotation thereof, and means on the web disposed inwardly of the marginal edges thereof and extending at right angles thereto for attaching a spool holder to a fishing rod.

2. A device is claimed in claim 1, wherein the rod attachment means comprises a generally frusto-conical member tapering in a direction away from the web, and has a discontinuous slope and is provided on the exterior thereof with a plurality of longitudinal ribs.

3. A device according to claim 1, wherein the resilient arms are each provided with a rib extending longitudinally thereof whereby to increase the stiffness thereof, and the rod-attachment means is a generally frusto-conical member tapering in a direction away from the web, the frusto-conical member having a discontinuous slope and being provided on the exterior thereof with a plurality of longitudinal ribs.

* * * * *